(12) United States Patent
Behera et al.

(10) Patent No.: US 10,588,033 B2
(45) Date of Patent: Mar. 10, 2020

(54) SYSTEM AND METHOD FOR ASSISTED LINK PREDICTION MECHANISM IN ROBOTIC COMMUNICATIONS

(71) Applicant: Tata Consultancy Services Limited, Mumbai (IN)

(72) Inventors: Sipra Behera, Bangalore (IN); Hemant Kumar Rath, Bhubaneswar (IN); Jyotirmoy Karjee, Bangalore (IN); Anantha Simha, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 26 days.

(21) Appl. No.: 15/912,327

(22) Filed: Mar. 5, 2018

(65) Prior Publication Data
US 2019/0053074 A1    Feb. 14, 2019

(30) Foreign Application Priority Data

Aug. 10, 2017  (IN) .............................. 201721028535

(51) Int. Cl.
*H04L 12/24* (2006.01)
*H04W 24/02* (2009.01)
(Continued)

(52) U.S. Cl.
CPC ........... *H04W 24/02* (2013.01); *B25J 9/1682* (2013.01); *H04B 17/318* (2015.01); *H04L 41/12* (2013.01);
(Continued)

(58) Field of Classification Search
CPC ..... H04W 24/02; H04W 24/08; H04W 76/10; H04B 17/318; H04L 41/12; H04L 67/12;
(Continued)

(56) References Cited

U.S. PATENT DOCUMENTS

| 9,661,477 | B1 | 5/2017 | Ebrahimi Afrouzi | |
|---|---|---|---|---|
| 2015/0023202 | A1* | 1/2015 | Shattil | H04W 52/267 370/252 |
| 2015/0304634 | A1* | 10/2015 | Karvounis | H04N 13/239 348/46 |

OTHER PUBLICATIONS

Kudelski, M. et al., "A Mobility-Controlled Link Quality Learning Protocol for Multi-robot Coordination Tasks", Robotics and Automation (ICRA), IEEE International Conference on May 31-Jun. 7, 2014, 8 pages Retrieved from https://pdfs.semanticscholar.org/fefc/e47edcf4bd392daa3236545807ae8518c1d0.pdf.
(Continued)

*Primary Examiner* — Kent Krueger
(74) *Attorney, Agent, or Firm* — Finnegan, Henderson, Farabow, Garrett & Dunner LLP

(57) ABSTRACT

Robotic applications are important in both indoor and outdoor environments. Establishing reliable end-to-end communication among robots in such environments are inevitable. Many real-time challenges in robotic communications are mainly due to the dynamic movement of robots, battery constraints, absence of Global Position System (GPS), etc. Systems and methods of the present disclosure provide assisted link prediction (ALP) protocol for communication between robots that resolves real-time challenges link ambiguity, prediction accuracy, improving Packet Reception Ratio (PRR) and reducing energy consumption in-terms of lesser retransmissions by computing link matrix between robots and determining status of a Collaborative Robotic based Link Prediction (CRLP) link prediction based on a comparison of link matrix value with a predefined covariance link matrix threshold. Based on determined status, robots either transmit or receive packet, and the predefined covariance link matrix threshold is dynamically updated. If the link to be predicted is unavailable, the system resolves ambiguity thereby enabling communication between robots.

20 Claims, 8 Drawing Sheets

(51) Int. Cl.
    *B25J 9/16* (2006.01)
    *H04B 17/318* (2015.01)
    *H04W 76/10* (2018.01)
    *H04W 24/08* (2009.01)
    *H04L 29/08* (2006.01)

(52) U.S. Cl.
    CPC ............ *H04W 24/08* (2013.01); *H04W 76/10* (2018.02); *G05B 2219/39146* (2013.01); *G05B 2219/39153* (2013.01); *G05B 2219/40205* (2013.01); *G05B 2219/40434* (2013.01); *H04L 67/12* (2013.01)

(58) Field of Classification Search
    CPC ........... G05B 2219/39146; G05B 2219/39153; G05B 2219/40434
    See application file for complete search history.

(56) References Cited

OTHER PUBLICATIONS

Tardioli, D. et al., "Enforcing network connectivity in robot team missions", The International Journal of Robotics Research, vol. 29, Issue 4, Mar. 2010, 19 pages Retrieved from https://www.researchgate,net/profile/Alejandro_Mosteo/publication/220122511_Enforcing_Network_Connectivity_in_Robot_Team_Missions/links/5641de3508aeacfd8937c511/Enforcing-Network-Connectivity-in-Robot-Team-Missions.pdf.

\* cited by examiner

SYSTEM AND METHOD FOR ASSISTED LINK PREDICTION MECHANISM IN ROBOTIC COMMUNICATIONS

PRIORITY CLAIM

This U.S. patent application claims priority under 35 U.S.C. § 119 to: India Application No. 201721028535, filed on Aug. 10, 2017. The entire contents of the aforementioned application are incorporated herein by reference.

TECHNICAL FIELD

The disclosure herein generally relate to protocols for communication amongst robots, and, more particularly, to assisted link prediction protocol for establishing communication amongst robots.

BACKGROUND

Robotic applications are important in both indoor and outdoor environments. Establishing reliable end-to-end communication among robots in such environments are inevitable. Many real-time challenges in robotic communications are mainly due to the dynamic movement of robots, battery constraints, absence of Global Position System (GPS), etc. After recognizing these challenges, building a communication framework among the robots demands the prior knowledge of network connectivity.

SUMMARY

Embodiments of the present disclosure present technological improvements as solutions to one or more of the above-mentioned technical problems recognized by the inventors in conventional systems. For example, in one aspect, a processor implemented method for providing an assisted link prediction protocol for communication amongst robots is provided. The method comprising: computing, using a Collaborative Robotic based Link Prediction (CRLP) protocol, a link matrix between a first set of robots and a second set of robots deployed in an environment; performing a comparison of a value associated with the link matrix and a predefined link covariance matrix threshold; determining at least one status of a CRLP-based link prediction between the first set of robots and the second set of robots based on the comparison, wherein the at least one status comprises an unavailable status and an available status; and establishing, using an Assisted Link Prediction (ALP) Protocol, a communication link between the first set of robots and the second set of robots based on the determined at least one status, and performing one of: receiving, via the established communication link, by a robot from the first set of robots, a first set of beacon packets from at least one robot from the second set of robots, and dynamically updating, using the ALP protocol, the predefined link covariance matrix threshold based on a comparison of a power of the received first set of beacon packets with a predefined Received Signal Strength Indicator (RSSI) threshold; or transmitting via the established communication link, by a robot from the first set of robots, a second set of beacon packets to at least one robot from the second set of robots, and dynamically updating, using the Assisted Link Prediction (ALP) Protocol, the predefined link covariance matrix threshold based on a receipt of an acknowledgement for the second set of beacon packets being transmitted to the at least one robot from the second set of robots.

In an embodiment, when the first set of beacon packets is received, the predefined link covariance matrix threshold is updated by reducing a value of the predefined link covariance matrix threshold and a final link prediction value is reset to a first value. In an embodiment, when the second set of beacon packets is transmitted, the predefined link covariance matrix threshold is updated by increasing a value of the predefined link covariance matrix threshold, and by resetting a final link prediction value to a first value.

In an embodiment of the present disclosure, the value comprises a minimum coefficient of the link matrix. In an embodiment, when the minimum coefficient is greater than or equal to the predefined link covariance matrix threshold, the at least one status of the CRLP-based link prediction between the first set of robots and the second set of robots is determined as the available status.

In an embodiment, when the robot from the first set of robots does not receive the first set of beacon packets, the method comprises resetting a final link prediction value to a second value.

The method may further comprise updating a final prediction link value to a first value upon the receipt of the acknowledgement for the first set of beacon packets being transmitted to the at least one robot from the second set of robots. The method may further comprise resolving, using the ALP protocol, a reception quality in the CRLP-based link prediction based on the transmitted second set of beacon packets and the acknowledgement.

In an embodiment, when the power of the received first set of beacon packets is greater than a predefined Received Signal Strength Indicator (RSSI) threshold, the value of the predefined link covariance matrix threshold is reduced and the final link prediction value is reset to the first value.

In another aspect, a system for providing an assisted link prediction protocol for communication amongst robots is provided comprising: a memory storing instructions; one or more communication interfaces; and one or more hardware processors coupled to the memory via the one or more communication interfaces (106), wherein the one or more hardware processors are configured by the instructions to: compute, using a Collaborative Robotic based Link Prediction (CRLP) protocol, a link matrix between a first set of robots and a second set of robots deployed in an environment; perform a comparison of a value associated with the link matrix and a predefined link covariance matrix threshold; determine at least one status of a CRLP-based link prediction between the first set of robots and the second set of robots based on the comparison, wherein the at least one status comprises an unavailable status and an available status; establish, using an Assisted Link Prediction (ALP) Protocol, a communication link between the first set of robots and the second set of robots based on the determined at least one status, and perform one of: receiving, via the established communication link, by a robot from the first set of robots, a first set of beacon packets from at least one robot from the second set of robots, and dynamically updating, using the ALP protocol, the predefined link covariance matrix threshold based on a comparison of a power of the received first set of beacon packets with a predefined Received Signal Strength Indicator (RSSI) threshold; or transmitting via the established communication link, by a robot from the first set of robots, a second set of beacon packets to at least one robot from the second set of robots, and dynamically updating, using the Assisted Link Prediction (ALP) Protocol, the predefined link covariance matrix threshold based on a receipt of an acknowledgement for the second set of beacon packets being transmitted to the at least one robot from the second set of robots.

In an embodiment, when the first set of beacon packets is received, the predefined link covariance matrix threshold is updated by reducing a value of the predefined link covariance matrix threshold and a final link prediction value is reset to a first value. In an embodiment, when the second set of beacon packets is transmitted, the predefined link covariance matrix threshold is updated by increasing a value of the predefined link covariance matrix threshold, and a final link prediction value is reset to a first value.

In an embodiment of the present disclosure, the value comprises a minimum coefficient of the link matrix. In an embodiment, when the minimum coefficient is greater than or equal to the predefined link covariance matrix threshold, the at least one status of the CRLP-based link prediction between the first set of robots and the second set of robots is determined as the available status.

In an embodiment, when the robot from the first set of robots does not receive the first set of beacon packets, the method comprises resetting a final link prediction value to a second value.

The one or more hardware processors are further configured by the instructions to update a final prediction link value to a first value upon the receipt of the acknowledgement for the first set of beacon packets being transmitted to the at least one robot from the second set of robots. The one or more hardware processors are further configured by the instructions to resolve, using the ALP protocol, a reception quality in the CRLP-based link prediction based on the transmitted second set of beacon packets and the acknowledgement.

In an embodiment, when the power of the received first set of beacon packets is greater than a predefined Received Signal Strength Indicator (RSSI) threshold, the value of the predefined link covariance matrix threshold is reduced and the final link prediction value is reset to the first value.

In yet another one aspect, one or more non-transitory machine readable information storage mediums comprising one or more instructions is provided. The one or more instructions which when executed by one or more hardware processors causes computing, using a Collaborative Robotic based Link Prediction (CRLP) protocol, a link matrix between a first set of robots and a second set of robots deployed in an environment; performing a comparison of a value associated with the link matrix and a predefined link covariance matrix threshold; determining at least one status of a CRLP-based link prediction between the first set of robots and the second set of robots based on the comparison, wherein the at least one status comprises an unavailable status and an available status; and establishing, using an Assisted Link Prediction (ALP) Protocol, a communication link between the first set of robots and the second set of robots based on the determined at least one status, and performing one of: receiving, via the established communication link, by a robot from the first set of robots, a first set of beacon packets from at least one robot from the second set of robots, and dynamically updating, using the ALP protocol, the predefined link covariance matrix threshold based on a comparison of a power of the received first set of beacon packets with a predefined Received Signal Strength Indicator (RSSI) threshold; or transmitting via the established communication link, by a robot from the first set of robots, a second set of beacon packets to at least one robot from the second set of robots, and dynamically updating, using the Assisted Link Prediction (ALP) Protocol, the predefined link covariance matrix threshold based on a receipt of an acknowledgement for the second set of beacon packets being transmitted to the at least one robot from the second set of robots.

In an embodiment, when the first set of beacon packets is received, the predefined link covariance matrix threshold is updated by reducing a value of the predefined link covariance matrix threshold and by resetting a final link prediction value to a first value. In an embodiment, when the second set of beacon packets is transmitted, the predefined link covariance matrix threshold is updated by increasing a value of the predefined link covariance matrix threshold, and a final link prediction value is reset to a first value.

In an embodiment of the present disclosure, the value comprises a minimum coefficient of the link matrix. In an embodiment, when the minimum coefficient is greater than or equal to the predefined link covariance matrix threshold, the at least one status of the CRLP-based link prediction between the first set of robots and the second set of robots is determined as the available status.

In an embodiment, when the robot from the first set of robots does not receive the first set of beacon packets, the method comprises resetting a final link prediction value to a second value.

The instructions when executed by the one or more hardware processor may further cause updating a final prediction link value to a first value upon the receipt of the acknowledgement for the first set of beacon packets being transmitted to the at least one robot from the second set of robots. The instructions when executed by the one or more hardware processor may further cause resolving, using the ALP protocol, a reception quality in the CRLP-based link prediction based on the transmitted second set of beacon packets and the acknowledgement.

In an embodiment, when the power of the received first set of beacon packets is greater than a predefined Received Signal Strength Indicator (RSSI) threshold, the value of the predefined link covariance matrix threshold is reduced and the final link prediction value is reset to the first value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
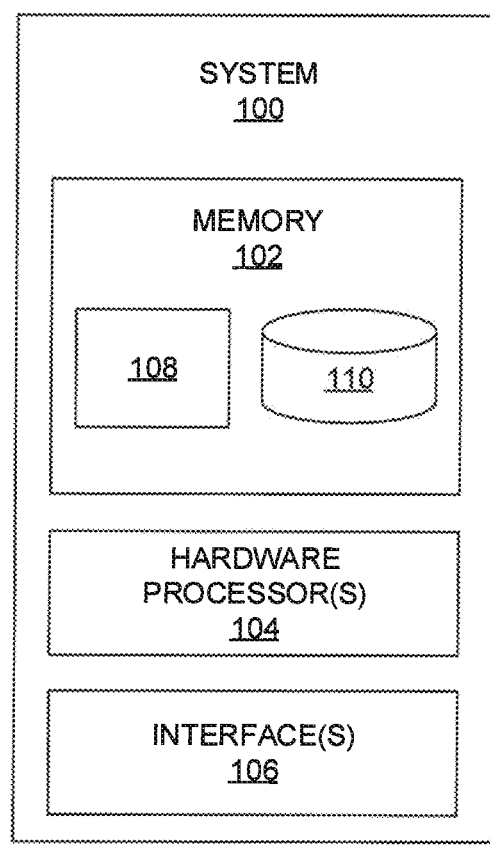
FIG. 1 illustrates an exemplary block diagram of a system for providing assisted link prediction (ALP) protocol for establishing communication amongst robots deployed in an environment according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure consider a constrained indoor environment where multiple mobile robots are deployed. These robots follow a multitier architecture where robots communicate among themselves as well as with the Fog nodes and then to a central cloud. In-order to maintain a consistent network connectivity Collaborative Robotic based Link Prediction (CRLP) mechanism is being used. In CRLP mechanism, the communication link availability between a pair of robots is computed using a covariance link matrix. This link matrix is computed using Extended Kalman Filter (EKF) based on the robotic motion and the wireless channel between a pair of robots. This mechanism computes the qualitative value for link availability by comparing the minimum coefficient of link matrix with a fixed threshold ($\lambda=\lambda_f$), where $\lambda_f$ is the fixed value. As $\lambda_f$ is considered as fixed, link prediction in CRLP mechanism is inaccurate. Further with the addition of unpredictable nature of the channel, possibility of obstructions in an indoor environment, etc., this issue becomes further complicated. In CRLP mechanism, a robot $R_i$ can predict availability of link with another robot $R_j$, without the knowledge of the link status of neighboring robot $R_j$ with it. It is also possible that R is unable to predict the link with $R_i$. This leads to link ambiguity problem which can degrade the reliability of link prediction and results in packet loss in the network. Though the link ambiguity problem can be solved using the active link monitoring, it requires continuous scanning of the channel. Hence it consumes more energy and is not suitable for energy constrained robots. To overcome all these issues as mentioned earlier, a CRLP based Assisted Link Prediction (ALP) protocol for robotic communications is proposed by the embodiments of the present disclosure.

Referring now to the drawings, and more particularly to FIGS. 1 through 8, where similar reference characters denote corresponding features consistently throughout the figures, there are shown preferred embodiments and these embodiments are described in the context of the following exemplary system and/or method.

FIG. 1 illustrates an exemplary block diagram of a system 100 for providing assisted link prediction (ALP) protocol for establishing communication amongst robots deployed in an environment according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment one or more modules 108 and a database 110 can be stored in the memory 102, wherein the database 110 may comprise, information, but is not limited to information pertaining to reception quality, ambiguity in receiving/transmitting beacon packets, number of robots that are available for communication, a pre-defined covariance matrix threshold, a predefined Received Signal Strength Indicator (RSSI) threshold, values associated with updation of the pre-defined covariance matrix threshold, and the like.

Figure 2:
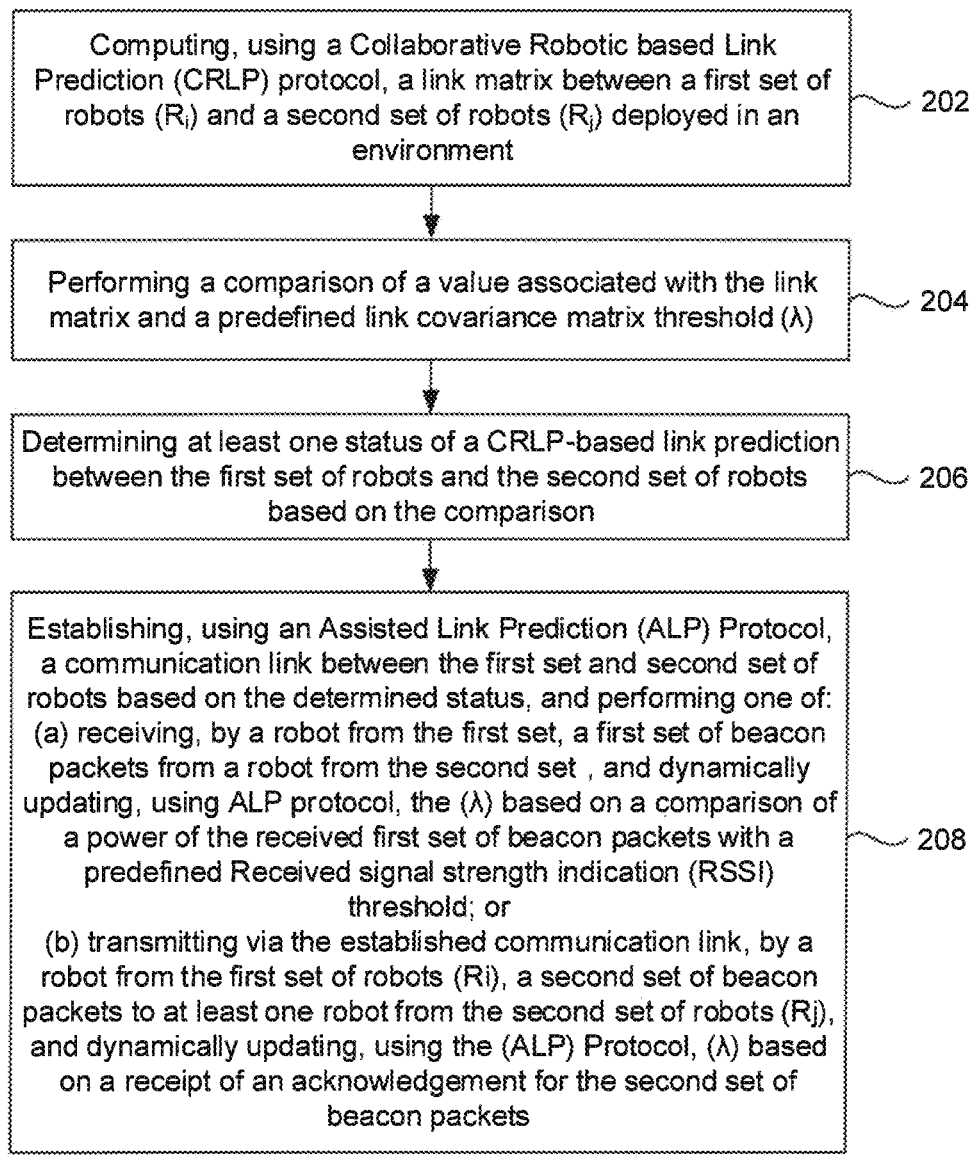
FIG. 2 illustrates an exemplary flow diagram of a method for providing assisted link prediction (ALP) protocol for establishing communication amongst robots deployed in an environment using the system of FIG. 1 according to an embodiment of the present disclosure.
Figure 3:
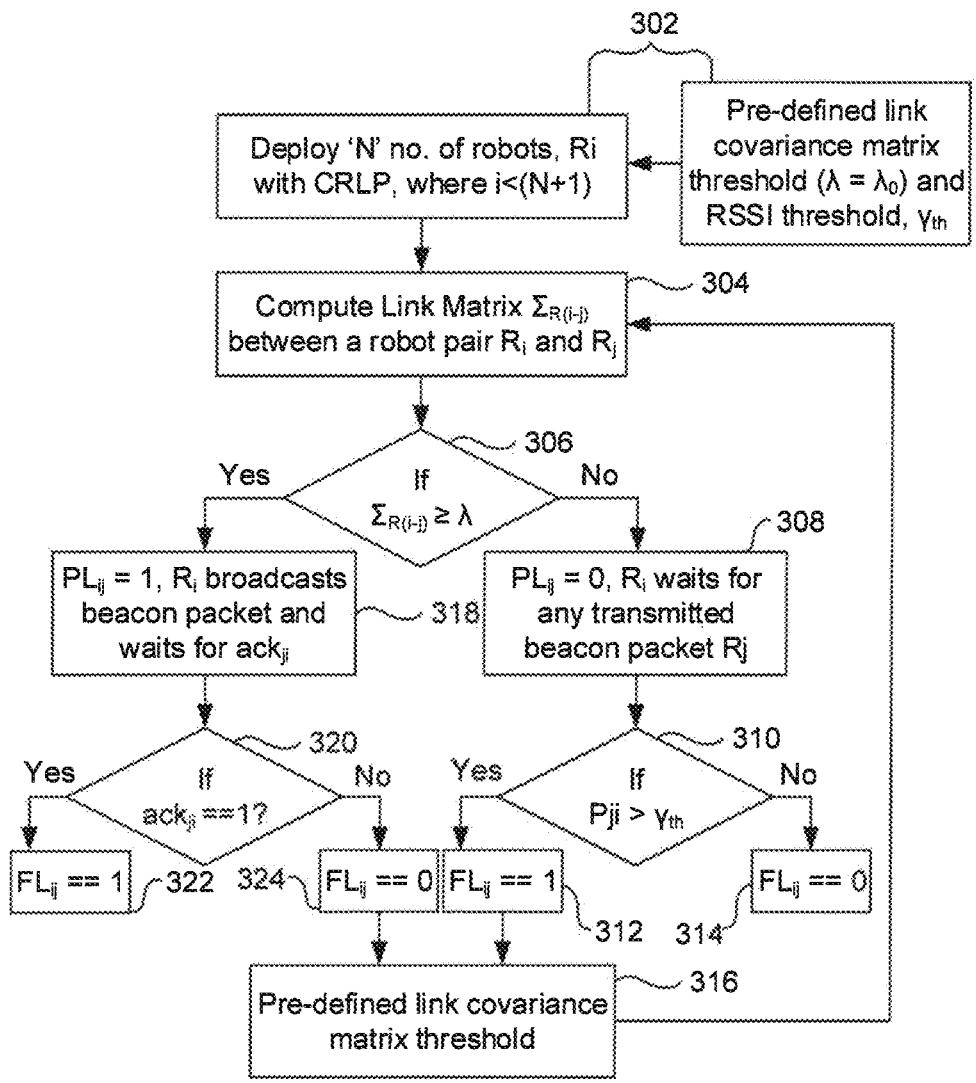
FIG. 3 is a flow chart illustrating an implementation of the method of FIG. 2 in accordance with an example embodiment of the present disclosure.
Figure 4:
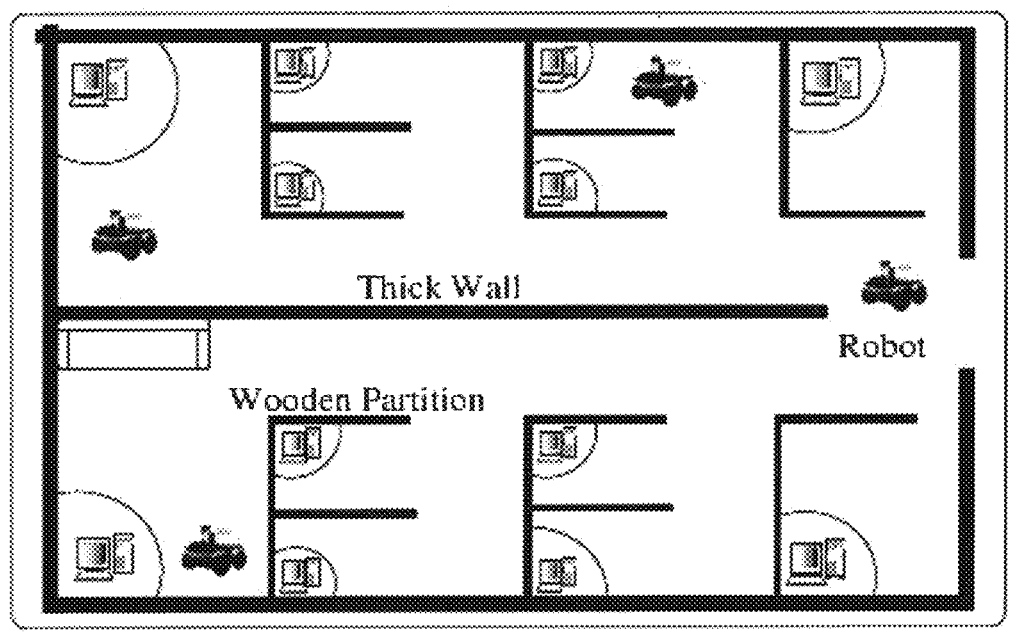
FIG. 4 depicts deployment of robots in an indoor scenario according to an example embodiment of the present disclosure.

FIG. 2, with reference to FIG. 1, illustrates an exemplary flow diagram of a method for providing assisted link prediction (ALP) protocol for establishing communication amongst robots deployed in an environment using the system 100 according to an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1, FIG. 3-4, and the flow diagram. In an embodiment of the present disclosure, at step 202, the one or more hardware processors 104 compute, using a Collaborative Robotic based Link Prediction (CRLP) protocol, a link matrix between a first set of robots ($R_i$) and a second set of robots ($R_j$) deployed in an environment. In an embodiment, the link matrix denoted by ($\Sigma_{R_{(i-j)}}$) is computed between a robot pair $R_i$ and $R_j$ as depicted in step 304 of FIG. 3. The environment, for example, may comprise but is not limited to an indoor scenario as depicted in FIG. 4 wherein robots are deployed. In an embodiment, a covariance matrix threshold $\lambda=\lambda_0$, and a RSSI threshold $Y_{th}$, both are predefined and are adjustable or reconfigurable (by user) based on the environment type for deployment of robots (refer step 302 of FIG. 3).

In an embodiment of the present disclosure, at step 204, the one or more hardware processors 104 perform a comparison of (i) a value associated with the link matrix ($\Sigma_{R_{(i-j)}}$) and (ii) the predefined link covariance matrix threshold. In an embodiment, the value comprises a minimum coefficient of the link matrix (min($\Sigma_{R_{(i-j)}}$)). In an embodiment, it is checked whether (min($\Sigma_{R_{(i-j)}}$)) is greater than or equal to the predefined link covariance matrix threshold $\lambda$ as depicted in step 306 of FIG. 3. In an embodiment of the present disclosure, at step 206, the one or more hardware processors 104 determine at least one status of a CRLP-based link prediction between the first set of robots and the second set of robots based on the comparison, wherein the at least one status comprises an unavailable status and an available status. In an embodiment of the present disclosure, at step 208, the one or more hardware processors 104 establish, using an Assisted Link Prediction (ALP) Protocol, a communication link between the first set of robots and the second set of robots based on the determined at least one status, and enable (or perform) based on the determined at least one status, one of: (a) receiving via the established communication link, by a robot from the first set of robots ($R_i$), a first set of beacon packets from at least one robot from the second set of robots ($R_j$), and dynamically updating, using the ALP protocol, the predefined link covariance matrix threshold $\lambda$ based on a comparison of a power of the received first set of beacon packets $P_{ji}$ with the predefined RSSI threshold $Y_{th}$, and (b) transmitting via the established communication link, by a robot from the first set of robots ($R_i$), a second set of beacon packets to at least one robot from the second set of robots ($R_j$), and dynamically updating, using the Assisted Link Prediction (ALP) Protocol, the predefined link covariance matrix threshold $\lambda$ based on a receipt of an acknowledgement for the second set of beacon packets being transmitted to the at least one robot from the second set of robots.

When the min($\Sigma_{R_{(i-j)}}$) of the link matrix is greater than or equal to the predefined link covariance matrix threshold $\lambda$, the determined at least one status is an available status. In other words, the CRLP-based link is predicted to be available. Else (if no), when the min($\Sigma_{R_{(i-j)}}$) of the link matrix is not greater than or equal to the predefined link covariance matrix threshold $\lambda$, the determined at least one status is an unavailable status. In other words, the CRLP-based link is predicted to be unavailable.

When the determined status is unavailable (e.g., CRLP predicted link is unavailable), the step of receiving via the established communication link, by a robot from the first set of robots ($R_i$), a first set of beacon packets from at least one robot from the second set of robots ($R_j$) is performed as depicted in step 308, and the predefined link covariance matrix threshold $\lambda$ Is dynamically updated based on a comparison of a power of the received first set of beacon packets $P_{ji}$ with the predefined RSSI threshold $Y_h$ as depicted in steps 310 to 316 of FIG. 3. More specifically, when the CRLP link is predicted to be unavailable where $PL_{ij}=0$, a robot from the first set of robots ($R_i$) waits for any transmitted beacon packets from at least one robot from the second set of robots ($R_j$) as depicted in step 308. Upon receipt of the transmitted beacon packets, it is checked whether the power of the received first set of beacon packets $P_{ji}$ is greater than the predefined RSSI threshold $Y_{th}$ as depicted in step 310 of FIG. 3. When the power of the received first set of beacon packets $P_{ji}$ is greater than the predefined RSSI threshold $Y_{th}$ ($P_{ji}>Y_{th}$), a final link prediction value is reset to a first value (e.g., unity or ($FL_{ij}=1$)) at step 312 and the step of 316 which is dynamically updating the predefined link covariance matrix threshold $\lambda$ is performed as depicted in step 316 of FIG. 3 thereby repeating the step of 202 (or step 302 of FIG. 3). Else, (if no) when the power of the received first set of beacon packets $P_{ji}$ is not greater than the predefined RSSI threshold $Y_{th}$, the final link prediction value is reset to a second value (e.g., zero or ($FL_{ij}=0$)) at step 314. In an embodiment, the step of dynamically updating the predefined link covariance matrix threshold $\lambda$ as depicted in step 316 comprises reducing a value of the predefined link covariance matrix threshold. In case, when the robot from the first set of robots ($R_i$) does not receive the first set of beacon packets, the final link prediction value is reset to the second value (e.g., zero). Further, when the CRLP-based link predicted is unavailable, the system 100 (or the one or more hardware processors) 104 resolves (or attempts to resolve), using the ALP protocol, a reception quality (e.g., an ambiguity) in the CRLP-based link prediction.

When the determined status is the available status (e.g., CRLP link predicted is available), the step of transmitting via the established communication link, by a robot from the first set of robots ($R_i$), a second set of beacon packets to at least one robot from the second set of robots ($R_j$) is performed as depicted at step 318 of FIG. 3, and the predefined link covariance matrix threshold $\lambda$ is dynamically updated based on a receipt of an acknowledgement for the second set of beacon packets being transmitted to the at least one robot from the second set of robots is performed. Upon transmission of the second set of beacon packets, it is checked whether the robot from the first set of robots is in receipt of an acknowledgement from the at least one robot (of the second set of robots) at step 320. If the robot is in receipt of the acknowledgement ($ack_{ji}=1$), a final link prediction value is reset to a first value (e.g., unity or ($FL_{ij}=1$)) at step 322. Else ($ack_{ji}\neq1$), the final link prediction value is reset to a second value (e.g., zero or ($FL_{ij}=0$)) at step 324 and the step of 316 which is dynamically updating predefined link covariance matrix threshold $\lambda$ is performed as depicted in step 316 of FIG. 3 thereby repeating the step of 202 (or step 302 of FIG. 3). In an embodiment, the step of dynamically updating the predefined link covariance matrix threshold $\lambda$ as depicted in step 316 comprises increasing (or incrementing) a value of the predefined link covariance matrix threshold.

Below described is Collaborative Robotic based Link Prediction Mechanism:

The CRLP mechanism uses EKF and path-loss modeling to compute link matrix between a pair of robots. The link matrix, ($\Sigma_{R(i-j)}$) between robots $R_i$ and $R_j$ is computed as:

$$\Sigma(\Sigma_{R_{(i-j)}}) = (I - K_t H)\Sigma_t^- \qquad (1)$$

The input CRLP parameters considered for the computation of link matrix are given in TABLE 1. $K_t$ is the Kalman Gain, H is the Jacobian matrix incorporating the path loss modeling for link estimation and $\Sigma_t^-$ as the predicted covariance matrix based on robotic pose during motion.

TABLE 1

| Parameters | Formula |
|---|---|
| $K_t$ | $\sum_t H^T \left( H_t \sum_t H_t^T + R \right)^{-1}$ |
| H | $\left( \begin{bmatrix} \frac{\partial D_{i,j}}{\partial x} & \frac{\partial D_{i,j}}{\partial y} & \frac{\partial D_{i,j}}{\partial \theta} \\ \frac{\partial \alpha_{i,j}}{\partial x} & \frac{\partial \alpha_{i,j}}{\partial y} & \frac{\partial \alpha_{i,j}}{\partial \theta} \end{bmatrix} \right)$ |
| $\sum_t$ | $J_t \Sigma (t-1)_p J_t^T + Q_t$ |

In Jacobian matrix H, $D_{i,j}=\sqrt{(x_i-x_j)^2+(y_i-y_j)^2}$ is the distance between robot pair $R_i$ and $R_j$ with their x and y coordinates. The tuning angle is computed as $$\alpha_{i,j} = \tan\frac{(y_j - y_i)}{(x_j - x_i)} - \theta_i$$

which is computed which is computed from header angle, θ. In order to incorporate path-loss modeling, $D_{i,j}$ is replaced by $$D_{i,j}^c = d_0 10^{\frac{(P_0 - P_{i,j})}{10 n_p}},$$

where $D_{i,j}^c$ is the communication path among robots $R_i$ and $R_j$; $d_0$ is the reference distance, $P_0$ is the received power (in dBm) at the reference distance, $n_p$ is the path loss exponent and $P_{i,j}^-$ is the received power at $R_i$ and $R_j$.

$$P_{i,j}^- = P_0^- - 10 n_p \log_{10} \frac{D_{i,j}^c}{d_0} \quad (2)$$

To compute the predicted covariance matrix $\Sigma_t^-$, the Jacobian matrix $J_t$ is expressed as a non-linear function of $g(\hat{X}_{(t-1)i}, \hat{u}_{t_i}^-) = g(x_i, y_i, \theta_i, l_i, r_i))$ given by $$J_t = \begin{bmatrix} \frac{\partial g1(\hat{X}_{(t-1)i}, \hat{u}_{t_i}^-)}{\partial x} & \frac{\partial g1(\hat{X}_{(t-1)i}, \hat{u}_{t_i}^-)}{\partial y} & \frac{\partial g1(\hat{X}_{(t-1)i}, \hat{u}_{t_i}^-)}{\partial \theta} \\ \frac{\partial g2(\hat{X}_{(t-1)i}, \hat{u}_{t_i}^-)}{\partial x} & \frac{\partial g2(\hat{X}_{(t-1)i}, \hat{u}_{t_i}^-)}{\partial y} & \frac{\partial g2(\hat{X}_{(t-1)i}, \hat{u}_{t_i}^-)}{\partial \theta} \\ \frac{\partial g3(\hat{X}_{(t-1)i}, \hat{u}_{t_i}^-)}{\partial x} & \frac{\partial g1(\hat{X}_{(t-1)i}, \hat{u}_{t_i}^-)}{\partial y} & \frac{\partial g3(\hat{X}_{(t-1)i}, \hat{u}_{t_i}^-)}{\partial \theta} \end{bmatrix}$$

where $\hat{X}_{(t-1)i}$ is the previous state information and $\hat{u}_{t_i}^-$ is the control state information for robot $R_i$. The control state parameters $l_i$ and $r_i$ are the left and right wheel positions of robot $R_i$ depending on linear and angular velocity. The variance of each robot pose is captured by covariance matrix given by $$\sum_{(t-1)_p} = \begin{pmatrix} \sigma_{x_i} & 0 & 0 \\ 0 & \sigma_{y_i} & 0 \\ 0 & 0 & \sigma_{\theta_i} \end{pmatrix}.$$

Moreover, covariance matrix is expressed as $$Q_t = F_t \sum_{(t-1)_c} F_t^T = F_t \begin{bmatrix} \sigma_l & 0 \\ 0 & \sigma_r \end{bmatrix} F_t^T,$$

where $F_t$ is the Jacobian matrix for control state $(l_i, r_i)$ for Ri. $R = \Sigma_{(t-1)_c}$ as the environmental noise variance matrix. The Jacobian matrix $F_t$ is given by $$F_t = \begin{bmatrix} \frac{\partial g1(\hat{X}_{(t-1)i}, \hat{u}_{t_i}^-)}{\partial l} & \frac{\partial g1(\hat{X}_{(t-1)i}, \hat{u}_{t_i}^-)}{\partial r} \\ \frac{\partial g2(\hat{X}_{(t-1)i}, \hat{u}_{t_i}^-)}{\partial l} & \frac{\partial g2(\hat{X}_{(t-1)i}, \hat{u}_{t_i}^-)}{\partial r} \\ \frac{\partial g3(\hat{X}_{(t-1)i}, \hat{u}_{t_i}^-)}{\partial l} & \frac{\partial g3(\hat{X}_{(t-1)i}, \hat{u}_{t_i}^-)}{\partial r} \end{bmatrix}$$

The computed link matrix, $(\Sigma_{R_{(i-j)}})$ is used to develop the assisted link prediction mechanism as discussed below.

CRLP Based Assisted Link Prediction (ALP) Protocol:

The ALP protocol uses the link matrix of CRLP mechanism with an intelligent threshold based learning. This enhances prediction accuracy by utilizing a learning approach to update its threshold value unlike the fixed thresholding mechanism of CRLP. This technique uses a transmit-acknowledgement method, which resolves link ambiguity issue of CRLP as explained below.

Algorithm: Assisted Link Prediction (ALP) Protocol

Input: A set of N mobile robots $R_i$ ($\forall i \in N$), randomly deployed with CRLP algorithm; a pre-defined link covariance matrix threshold ($\lambda = \lambda_0$) and RSSI threshold $Y_{th}$
Output: Predict the link of $R_i$ with $R_j$, $\forall i,j \in N$ and $i \neq j$.
1. while t < (t+δ) do
2.   CRLP computes link matrix ($\Sigma_{R_{(i-j)}}$) between robot, $R_i$ and $R_j$ with threshold, $\lambda = \lambda_0$.
3.   if min($\Sigma_{R_{(i-j)}}$) ≥ λ then
4.         $PL_{ij} \leftarrow 1$
5.   else
6.         $PL_{ij} \leftarrow 0$
7.   end if
8.   $R_i$ checks all $PL_{ij}$, $\forall j \in N$.
9.   if $PL_{ij} == 0$ then

| | Algorithm: Assisted Link Prediction (ALP) Protocol |
|---|---|
| 10. | $R_i$ waits for any transmitted packet from $R_j$, $\forall j$. |
| 11. | if $P_{i,j} > \gamma_{th}$ then |
| 12. |     $FL_{ij} \leftarrow 1$, update $\lambda$ |
| 13. | else |
| 14. |     $FL_{ij} \leftarrow 0$ |
| 15. | end if |
| 16. | else if $PL_{ij} == 1$ then |
| 17. |     $R_i$ broadcasts a beacon packet and waits for $ack_{ji}$. |
| 18. |     if $ack_{ji} == 1$ then |
| 19. |         $FL_{ij} \leftarrow 1$ |
| 20. |     else |
| 21. |         $FL_{ij} \leftarrow 0$, update $\lambda$ |
| 22. |     end if |
| 23. | end if |
| 24. | end while |
| 25. | $t \leftarrow t + \delta$ |

This process continues every time robot R intends to initiate communication with the central entity or in every time slot as required by the deployment process.

Performance Evaluation

To validate the proposed ALP protocol on mobile robots in an indoor environment, two different experiments were performed. In the first experiment, the robotic deployment scenario was simulated in Robot Operating System (ROS) platform using Gazebo simulator. In the second experiment, a test-bed was developed by porting the ALP protocol on Rpi-3 boards.

Implementation in Robot Operating System Platform

Four Husky robots were deployed in an area of 40*40 meter square using Gazebo simulator. In this deployment scenario, multiple obstructions were considered as depicted in FIG. 4. Out of these deployed Husky robots, three robots are considered as mobile and one robot is considered as static (used only as a reference node for path loss modeling of wireless channel). The mobile robots are fed with Kinect® sensors to capture the vision of nearby environment. These sensor's output are processed by the OpenCV Library to create the image of the nearby environment and to avoid the collision with the help of an obstacle-avoider mechanism. Apart from this, the complex mathematical functionalities of the CRLP mechanism are implemented using Eigen Library.

Each robot in Gazebo simulator behaves as a ROS node. The communication among the robots is realized by Publish-Subscribe model of ROS service. In this model, the robots exchange messages among each other with the help of ROS topic. The communication parameters considered in the deployment scenario are given in TABLE 2. The implementation detail of the ALP protocol using OpenCV, Eigen libraries and Publish-Subscribe feature of ROS are discussed as follows.

TABLE 2

| Parameter | Values |
|---|---|
| Frequency | 5.15 GHz |
| Communication Range | 15 meters |
| Transmit Power | (100 mW) 20 dBM |
| RSSI—Threshold | −34 dBm |
| Path-loss Exponent | 5 |

Interfacing External Libraries to ROS: OpenCV is an external library to ROS Indigo or higher version. To interface between OpenCV and ROS, ROS in-built package CvBridge was used. This package is utilized as an input to the proposed system 100 and to perform the above methodology. In-order to provide the required input to build the system 100, ROS has a special file called CMakeLists.txt. In the proposed simulation, the following command was added to the file to link OpenCV with ROS.

find_package(OpenCV REQUIRED)
    include_directories(catkin_INCLUDE_DIRS
    $OpenCV_INCLUDE_DIRS)
    find_package(cv_bridge)

The Eigen library is used to implement the mathematical functionality demanded by the CRLP mechanism to compute the link matrix. Since it is a pure template library, it does not require any modification in CMakeLists.txt file to use in ROS. The following header file to achieve all the eigen functionalities of our software development process:

include <eigen3/Eigen/Dense>

Figure 5:
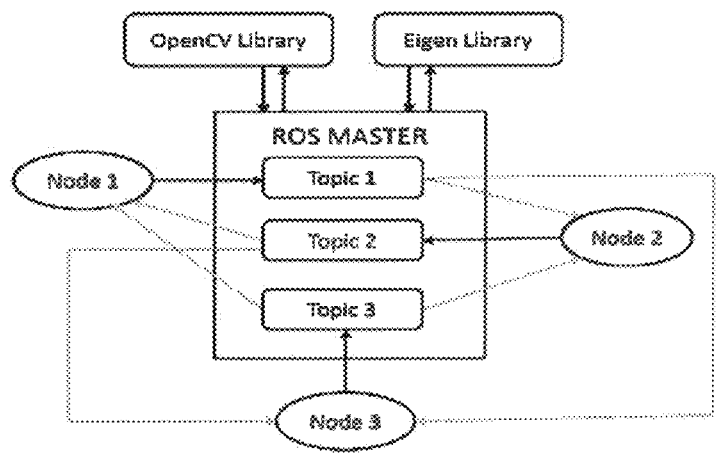
FIG. 5 depicts a Publish-Subscribe Model implementation in Robot Operating System (ROS) platform according to an example embodiment of the present disclosure.

CRLP Based ALP Implementation Using Publish-Subscribe Model:

The Publish-Subscribe based model utilizes three mobile robots as shown in FIG. 5. Each node in the figure represents a mobile robot. The ROS Master is the central entity which has registration APIs that allows nodes to register as publishers, subscribers, and service providers. All the external libraries are internally binded to ROS Master through the build system. In the current Publish-Subscribe model, each node has a separate ROS topic registered at ROS Master. Each node communicates with other node by exchanging messages through these ROS topics. In-order to create a ROS topic for each node, we define messages in the file of the package (i.e., msg file). Each node advertises its respective topic in ROS using advertise<package_name::msg_name> command and publishes its messages to that topic. When the other nodes need the messages from that node, they subscribe to that particular node's topic. To subscribe a message from a topic, an object for the rossubscriber class (e.g., sub) is created and the subscribed message is copied using this object.

In the proposed deployment scenario, each mobile robot as a ROS node advertises it's topic which is registered at ROS Master as shown in FIG. 5. Each Topic (i.e., Topic 1, Topic 2 and Topic 3) stores the information like CRLP predicted link (PL), ALP/final predicted link (FL), acknowledgement status ($ack_{ji}$), acknowledgement packet strength ($P_{i,j}^-$), number of packet transmitted (txpkt), total packet received (rxpkt), broadcast status, etc., for respective nodes. Each robot takes its own decision for the link status with its peer and computes PRR. The main advantage of implementing the CRLP based ALP protocol in ROS platform is that it can be easily ported to a variety of robots, drones, android smart phones and smart gateways, etc.

SIMULATED RESULTS AND DISCUSSION

Figure 6:
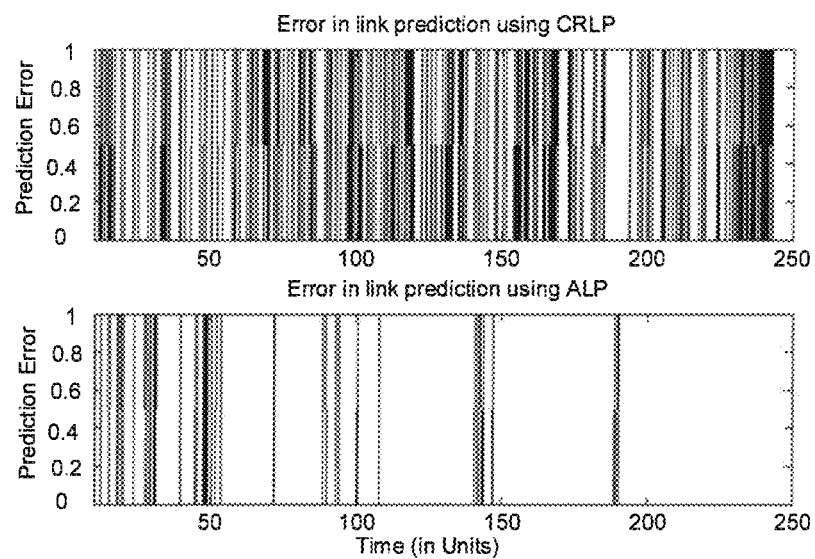
FIG. 6 is a graphical representation illustrating error comparison for CRLP and ALP protocol mechanism according to an example embodiment of the present disclosure.

Based on the implementation of the proposed protocol as shown in FIG. 5, the prediction error of CRLP mechanism is compared with that of ALP protocol as shown in FIG. 6. Three phases are considered in link prediction such as convergence, training and prediction phase respectively. The entire simulation time is between t=0 to t=250 units and is divided into three phases; t=0 to t=10 units is the convergence phase, t=10.1 to t=52 units is the training phase t=52.1 to t=250 units is the prediction phase. The duration of the training phase can further be improved with the help of better processing power of the simulation environment. It is observed that the duration of these phases are dynamic and depends upon the deployment scenario. From FIG. 6, it is observed that in case of CRLP, the predicted error is more for the entire duration and the robot is in its training phase most of the time. In ALP protocol, predicted error is more up-to time t=52 units and after that it is observed less occurrence of error (less number of spikes). This confirms that ALP protocol takes much lesser time to reach prediction phase as compared to CRLP and delivers a quick response in terms of link prediction. The predicted error percentage is also computed, i.e., how many times the prediction does not match with the measured RSSI value for both the mechanisms. With Prediction error percentage of 15.3426%, ALP outperforms CRLP (41.6584% error) and hence is better suited for link prediction.

Figure 7:
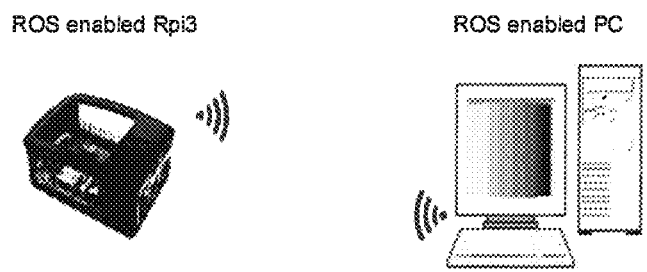
FIG. 7 depicts a ROS Network Setup using Rpi based Test-bed according to an example embodiment of the present disclosure.

Test-Bed Setup Using Rpi-3 Boards:

Test-bed implementation was conducted with the help of Rpi-3 boards. ROS Kinetic were installed on these boards and port the simulation based software package of ALP protocol on it. This enables one Rpi-3 board to emulate the link prediction functionalities of one robot in the deployment scenario. Note that, each ROS enabled device (either a Personal Computer (PC) or a Rpi-3 board) have its own ROS_MASTER. The network setup is extended to multiple ROS enabled devices by configuring each to same ROS_MASTER via ROS_MASTER_URI. The functionality of one robot (Client-1) was emulated on the Rpi-3 board whereas the other three robots (i.e., Client-2, Client-3 and the reference node) are present in Gazebo simulator of the ROS enabled PC. The network configuration in such a scenario is shown in FIG. 7. In-order to enable Client-1 to communicate and to predict the link with Client-2 and Client-3, the ROS_MASTER_URI of master node is set at Client-1. Apart from this, it is assumed that both the systems know each other's ROS_IP in the network. This utilizes the Publish-Subscribe model for exchanging messages between clients as discussed earlier.

Figure 8:
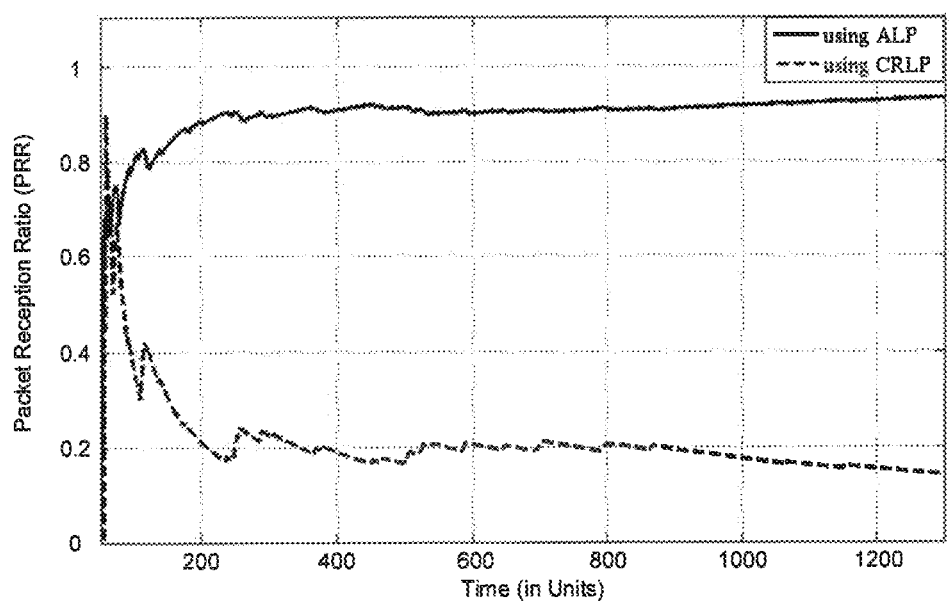
FIG. 8 is a graphical representation illustrating Packet Reception Ratio (PRR) comparison for CRLP and ALP protocol mechanism according to an example embodiment of the present disclosure.

After the network configuration, experiment(s) were conducted and a Packet Reception Ratio (PRR) value of CRLP mechanism was compared with that of ALP protocol. From the experiment, the link status of CRLP mechanism and ALP protocol from the ROS topic of respective clients were captured. Other parameters were also captured, for example, total transmitted packets by Client-1 and total received packets at Client-2 and Client-3 from the respective ROS topics and measure the PRR values as shown in FIG. 8. From FIG. 8, it is observed that due to ambiguity problem the PRR in CRLP protocol mechanism continuously degrades in the network as the time progress which signifies more number of packet drops. However, the proposed ALP protocol achieves better PPR by resolving this problem. The higher PRR captured for ALP protocol results in lesser retransmission of packets and is energy efficient than the CRLP mechanism.

Predicting the link among the robots in both indoor and outdoor scenarios with unavailability of GPS and continuous scanning remained a major challenge for robotic applications. In the present disclosure, a practical approach is proposed called Assisted Link Prediction (ALP) protocol which resolves this challenge. ALP is an extension to the CRLP mechanism which resolves the link ambiguity and can be implemented in real robots in a distributed fashion. To enable a quick porting of this protocol on the real robots, ROS based packages were developed. Apart from this, the developed software package for ALP protocol was ported to Rpi-3 boards and significant performance improvement was observed in terms of prediction time, PRR and energy saving, etc. The use of OpenCV and Eigen library was demonstrated in the development process. The framework with integration of these libraries within ROS can be used to address wide range of applications in robotic communications.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located (e.g., modules 108) therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising", "having", "containing" and "including" and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:

computing, using a Collaborative Robotic based Link Prediction (CRLP) protocol, a link matrix between a first set of robots and a second set of robots deployed in an environment, wherein the link matrix is computed based on a Kalman gain, Jacobian matrix incorporating distance between the first set of robots and the second set of robots along with x and y coordinates, a tuning angle computed from the x and y coordinates and a header angle, and path-loss modeling, and a covariance matrix capturing variance of each robot pose during motion;

performing a comparison of a value associated with the link matrix and a predefined link covariance matrix threshold, wherein the predefined link covariance matrix threshold is reconfigurable based on environment type for deployment of the first set of robots and the second set of robots;

determining at least one status of a CRLP-based link prediction between the first set of robots and the second set of robots based on the comparison, wherein the at least one status comprises an unavailable status and an available status;

establishing, using an Assisted Link Prediction (ALP) Protocol based on the link matrix computed using the CRLP protocol, a communication link between the first set of robots and the second set of robots based on the determined at least one status, and performing one of:

receiving, via the established communication link, by a robot from the first set of robots, a first set of beacon packets from at least one robot from the second set of robots, and dynamically updating, using the ALP protocol, the predefined link covariance matrix threshold based on a comparison of a power of the received first set of beacon packets with a predefined Received Signal Strength Indicator (RSSI) threshold; or transmitting via the established communication link, by a robot from the first set of robots, a second set of beacon packets to at least one robot from the second set of robots, and dynamically updating, using the Assisted Link Prediction (ALP) Protocol, the predefined link covariance matrix threshold based on a receipt of an acknowledgement for the second set of beacon packets being transmitted to the at least one robot from the second set of robots.

2. The method of claim 1, wherein when the first set of beacon packets is received, the predefined link covariance matrix threshold is updated by reducing a value of the predefined link covariance matrix threshold and by resetting a final link prediction value is reset to a first value.

3. The method of claim 1, wherein when the second set of beacon packets is transmitted, the predefined link covariance matrix threshold is updated by increasing a value of the predefined link covariance matrix threshold, and by resetting a final link prediction value to a first value.

4. The method of claim 1, wherein the value comprises a minimum coefficient of the link matrix.

5. The method of claim 4, wherein when the minimum coefficient is greater than or equal to the predefined link covariance matrix threshold, the at least one status of the CRLP-based link prediction between the first set of robots and the second set of robots is determined as the available status.

6. The method of claim 1, wherein when the robot from the first set of robots does not receive the first set of beacon packets, the method comprises resetting a final link prediction value to a second value.

7. The method of claim 1, further comprising updating a final prediction link value to a first value upon the receipt of the acknowledgement for the first set of beacon packets being transmitted to the at least one robot from the second set of robots.

8. The method of claim 1, further comprising resolving, using the ALP protocol, a reception quality in the CRLP-based link prediction based on the transmitted second set of beacon packets and the acknowledgement.

9. The method of claim 2, wherein when the power of the received first set of beacon packets is greater than a predefined Received Signal Strength Indicator (RSSI) threshold, the value of the predefined link covariance matrix threshold is reduced and the final link prediction value is reset to the first value.

10. A system (100) comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to:
compute, using a Collaborative Robotic based Link Prediction (CRLP) protocol, a link matrix between a first set of robots and a second set of robots deployed in an environment, wherein the link matrix is computed based on a Kalman gain, Jacobian matrix incorporating distance between the first set of robots and the second set of robots along with x and y coordinates, a tuning angle computed from the x and y coordinates and a header angle, and path-loss modeling, and a covariance matrix capturing variance of each robot pose during motion;
perform a comparison of a value associated with the link matrix and a predefined link covariance matrix threshold, wherein the predefined link covariance matrix threshold is reconfigurable based on environment type for deployment of the first set of robots and the second set of robots;
determine at least one status of a CRLP-based link prediction between the first set of robots and the second set of robots based on the comparison, wherein the at least one status comprises an unavailable status and an available status; and
establish, using an Assisted Link Prediction (ALP) Protocol based on the link matrix computed using the CRLP protocol, a communication link between the first set of robots and the second set of robots based on the determined at least one status, and perform one of:
receiving, via the established communication link, by a robot from the first set of robots, a first set of beacon packets from at least one robot from the second set of robots, and dynamically updating, using the ALP protocol, the predefined link covariance matrix threshold based on a comparison of a power of the received first set of beacon packets with a predefined Received Signal Strength Indicator (RSSI) threshold; or
transmitting via the established communication link, by a robot from the first set of robots, a second set of beacon packets to at least one robot from the second set of robots, and dynamically updating, using the Assisted Link Prediction (ALP) Protocol, the predefined link covariance matrix threshold based on a receipt of an acknowledgement for the second set of beacon packets being transmitted to the at least one robot from the second set of robots.

11. The system of claim 10, wherein when the first set of beacon packets is received, the predefined link covariance matrix threshold is updated by reducing a value of the predefined link covariance matrix threshold and a final link prediction value is reset to a first value.

12. The system of claim 10, wherein when the second set of beacon packets is transmitted, the predefined link covariance matrix threshold is updated by increasing a value of the predefined link covariance matrix threshold, and a final link prediction value is reset to a first value.

13. The system of claim 10, wherein the value comprises a minimum coefficient of the link matrix.

14. The system of claim 13, wherein when the minimum coefficient is greater than or equal to the predefined link covariance matrix threshold, the at least one status of the CRLP-based link prediction between the first set of robots and the second set of robots is determined as the available status.

15. The system of claim 10, wherein when the robot from the first set of robots does not receive the first set of beacon packets, the method comprises resetting a final link prediction value to a second value.

16. The system of claim 10, wherein the one or more hardware processors are further configured by the instructions to update a final prediction link value to a first value upon the receipt of the acknowledgement for the first set of beacon packets being transmitted to the at least one robot from the second set of robots.

17. The system of claim 10, wherein the one or more hardware processors are further configured by the instructions to resolve, using the ALP protocol, a reception quality in the CRLP-based link prediction.

18. The system of claim 11, wherein when the power of the received first set of beacon packets is greater than a predefined Received Signal Strength Indicator (RSSI) threshold, the value of the predefined link covariance matrix threshold is reduced and the final link prediction value is reset to the first value.

19. One or more non-transitory machine readable information storage mediums comprising one or more instructions which when executed by one or more hardware processors causes:
computing, using a Collaborative Robotic based Link Prediction (CRLP) protocol, a link matrix between a first set of robots and a second set of robots deployed in an environment, wherein the link matrix is computed based on a Kalman gain, Jacobian matrix incorporating distance between the first set of robots and the second set of robots along with x and y coordinates, a tuning angle computed from the x and y coordinates and a header angle, and path-loss modeling, and a covariance matrix capturing variance of each robot pose during motion;

performing a comparison of a value associated with the link matrix and a predefined link covariance matrix threshold, wherein the predefined link covariance matrix threshold is reconfigurable based on environment type for deployment of the first set of robots and the second set of robots;

determining at least one status of a CRLP-based link prediction between the first set of robots and the second set of robots based on the comparison, wherein the at least one status comprises an unavailable status and an available status;

establishing, using an Assisted Link Prediction (ALP) Protocol based on the link matrix computed using the CRLP protocol, a communication link between the first set of robots and the second set of robots based on the determined at least one status, and performing one of:

receiving, via the established communication link, by a robot from the first set of robots, a first set of beacon packets from at least one robot from the second set of robots, and dynamically updating, using the ALP protocol, the predefined link covariance matrix threshold based on a comparison of a power of the received first set of beacon packets with a predefined Received Signal Strength Indicator (RSSI) threshold; or transmitting via the established communication link, by a robot from the first set of robots, a second set of beacon packets to at least one robot from the second set of robots, and dynamically updating, using the Assisted Link Prediction (ALP) Protocol, the predefined link covariance matrix threshold based on a receipt of an acknowledgement for the second set of beacon packets being transmitted to the at least one robot from the second set of robots.

20. The one or more non-transitory machine readable information storage mediums of claim 19, wherein when the first set of beacon packets is received, the predefined link covariance matrix threshold is updated by reducing a value of the predefined link covariance matrix threshold and by resetting a final link prediction value is reset to a first value, and wherein when the second set of beacon packets is transmitted, the predefined link covariance matrix threshold is updated by increasing a value of the predefined link covariance matrix threshold, and by resetting a final link prediction value to a first value.

* * * * *